United States Patent
Basu et al.

(10) Patent No.: US 7,548,662 B2
(45) Date of Patent: Jun. 16, 2009

(54) SYSTEM AND PROCESS FOR INCREASING THE APPARENT RESOLUTION OF A DISPLAY

(75) Inventors: Sumit Basu, Seattle, WA (US); Patrick Baudisch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 11/040,839

(22) Filed: Jan. 21, 2005

(65) Prior Publication Data

US 2006/0165314 A1    Jul. 27, 2006

(51) Int. Cl.
G06K 9/32    (2006.01)

(52) U.S. Cl. .................. 382/299; 382/260; 382/275; 348/445; 348/448; 348/556; 348/581; 348/739

(58) Field of Classification Search .......... 382/260, 382/275, 299; 358/1.2, 3.26, 3.27, 463; 348/445, 348/448, 556, 581, 739
See application file for complete search history.

(56) References Cited

U.S. PATENT DOCUMENTS

| | | | | |
|---|---|---|---|---|
| 4,746,981 A | * | 5/1988 | Nadan et al. | 348/581 |
| 5,387,985 A | * | 2/1995 | Loce et al. | 358/447 |
| 5,414,811 A | * | 5/1995 | Parulski et al. | 345/501 |
| 5,604,825 A | * | 2/1997 | Hirota et al. | 382/261 |
| 6,262,694 B1 | * | 7/2001 | Ishimoto et al. | 345/1.1 |
| 6,453,074 B1 | * | 9/2002 | Zheng | 382/260 |
| 6,496,608 B1 | * | 12/2002 | Chui | 382/300 |
| 6,826,314 B2 | * | 11/2004 | Eguchi | 382/298 |
| 7,355,610 B2 | * | 4/2008 | Soroushi | 345/667 |
| 2004/0217918 A1 | * | 11/2004 | Ando et al. | 345/1.1 |
| 2006/0002635 A1 | * | 1/2006 | Nestares et al. | 382/299 |
| 2006/0104540 A1 | * | 5/2006 | Haussecker et al. | 382/276 |
| 2006/0110072 A1 | * | 5/2006 | Domera-Venkata | 382/299 |

OTHER PUBLICATIONS

Patti et al. "Superresolution Video Reconstruction with Arbitrary Sampling Lattices and Nonzero Aperture Time" IEEE Transactions on Image Processing, vol. 6, No. 8 Aug. 1997, pp. 1064-1076.*
"Super-Resolution Image Reconstruction: A Technical Overview" Park et al., IEEE Signal Processing Magazine, May 2003, pp. 21-36.*

* cited by examiner

*Primary Examiner*—Samir A. Ahmed
*Assistant Examiner*—Stephen R Koziol
(74) *Attorney, Agent, or Firm*—Lyon & Harr, LLP; Richard T. Lyon

(57) ABSTRACT

A system and process for creating an apparently higher resolution image on a display exhibiting a lower resolution is presented. The basic idea is to make multiple decimated versions of an image at different offsets in a smooth path (all of which will contain different bits of detail), and then animate through the resulting decimated images (i.e., show them in rapid succession). The viewer sees what looks like a higher-resolution image moving in a smooth path. The viewer sees this since the human eye is capable of integrating details over the continuous motion. Thus, images such as text enjoy an enhanced legibility.

18 Claims, 4 Drawing Sheets

FIG. 5
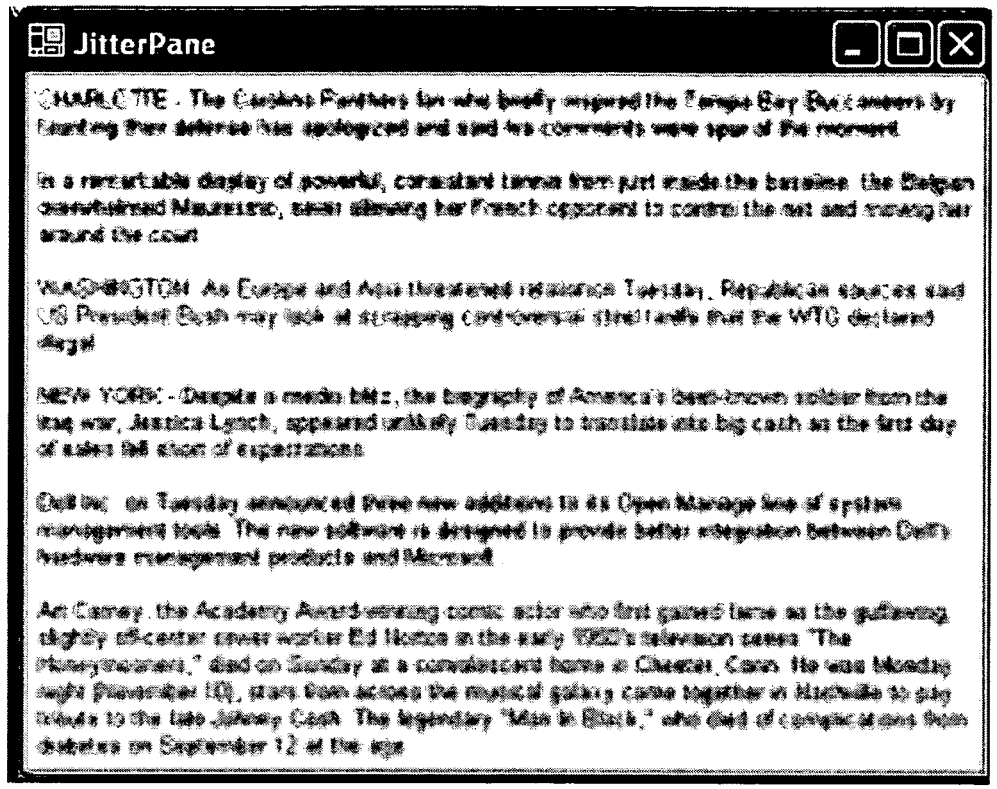
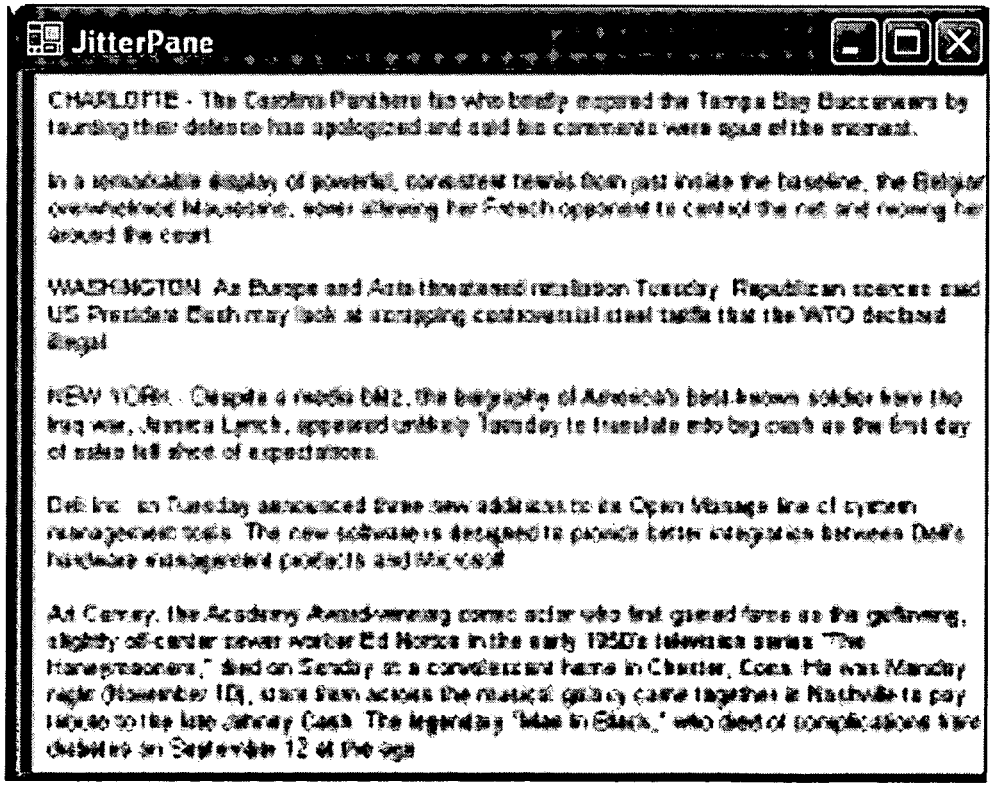
FIG. 6

SYSTEM AND PROCESS FOR INCREASING THE APPARENT RESOLUTION OF A DISPLAY

BACKGROUND

1. Technical Field

The invention is related to improving the readability of images displayed on a lower resolution display, and more particularly to a system and process for creating an apparently higher resolution image on a lower resolution display using an animation of decimated images.

2. Background Art

A great many small devices are cursed with small and relatively low resolution displays, both in terms of the number of pixels and pixel density. For example, many mobile electronic devices have these lower resolution displays. As a result, when these devices attempt to display detailed information such as text, maps, or images, either the user sees a very poor image obtained by decimating the original, or can only see a small part of the signal/image/text at a time and must scroll around to see the whole thing.

SUMMARY

The present invention is directed toward a system and process for creating an apparently higher resolution image on a lower resolution display. In general, the present system and process produces higher apparent resolution by using multiple decimated versions of an image at different pixel or sub-pixel offsets in a smooth path. Each decimated image contains different bits of detail, and when shown in rapid succession, a viewer sees what appears to be a higher-resolution image moving in a smooth path. This phenomenon derives from the fact that a human is capable of integrating disparate details seen over a continuous motion.

More particularly, the present system and process involves generating a sequence of images which exhibit a low resolution when displayed, where each of these displayed images was generated by sub-sampling a higher resolution image at the same sampling frequency, but at different offsets from each other. The sequence of images is then displayed in the order in which they were generated and at a prescribed rate, so as to create the appearance of the image having a higher resolution than that seen in the individual decimated images. It is noted that a computing device associated with a display can generate and display the sequence of decimated images, or a separate computing device can generate the images and then send them to another computing device for display in manner described above.

In regard to generating the sequence of decimated images, in one embodiment this involves first defining a sub-sampling grid having intersection points spaced apart so as to correspond to a prescribed sub-sampling frequency. The grid is then moved to different offset locations in relation to the aforementioned higher resolution image, and the higher resolution image is decimated at each offset to generate one of the decimated images. More particularly, a fixed point is assigned on the grid. Then, a path is established on or adjacent the higher resolution image. There are a plurality of predefined points along the path. For each of these points in turn, the closest pixel of the higher resolution image is found, and the fixed point of the grid is aligned with that pixel. In addition, the higher resolution image is decimated to establish, for each grid intersection, a single pixel value. This results in a decimated image according to the present invention. Thus, by following the points along the path and repeating the foregoing process the aforementioned sequence of images is produced.

When the sequence of images is displayed to a viewer, it appears as if the image has a higher resolution than the decimated images and moves in a course corresponding to the path. In one embodiment of the present system and process, this path is a smooth, closed path. This results in the movement appearing to follow a continuous looping course when the sequence of decimated images is repeatedly displayed.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 5 is an image of an optimal version of a test image as it would appear on a lower resolution display.

FIG. 6 is an example of a set of decimated images generated from a test image in accordance with the present invention, as it would appear on a lower resolution display. It is noted that there would be many more such images and they would be animated in sequence to produce a perception of higher resolution.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

In general, the present system and process produces a higher effective resolution for a given display. The basic idea is to make multiple sub-samplings of an image at different offsets in a smooth path (all of which will contain different bits of detail), and then animate through the resulting sub-sample images (i.e., show them in rapid succession). The viewer sees what looks like a higher-resolution image moving in a smooth path. The viewer sees this since the human eye is capable of integrating details over the continuous motion. Thus, images such as text enjoy an enhanced legibility.

The foregoing enhancement in apparent resolution is of significant importance for a variety of limited resolution devices—such as PDAs, cellphones, watches, and other devices equipped with low resolution displays. For example, in cases where an image or text needs to retain its original format—i.e., a newspaper, map, or the like, the present technique can increase the amount of text that can be fit onto the display and still be legible. Thus, even the small displays found on the aforementioned types of devices would be able to retain the original format of an image or text. This is particularly true in devices that have a relatively low resolution, but the pixels (pitch) are still relatively large. A good example is the Pocket PC, which typically has a display with a 240×320 resolution, but in a 2"×3" screen. A Smart Phone is another example which has a similar type of display.

The Computing Environment

Figure 1:
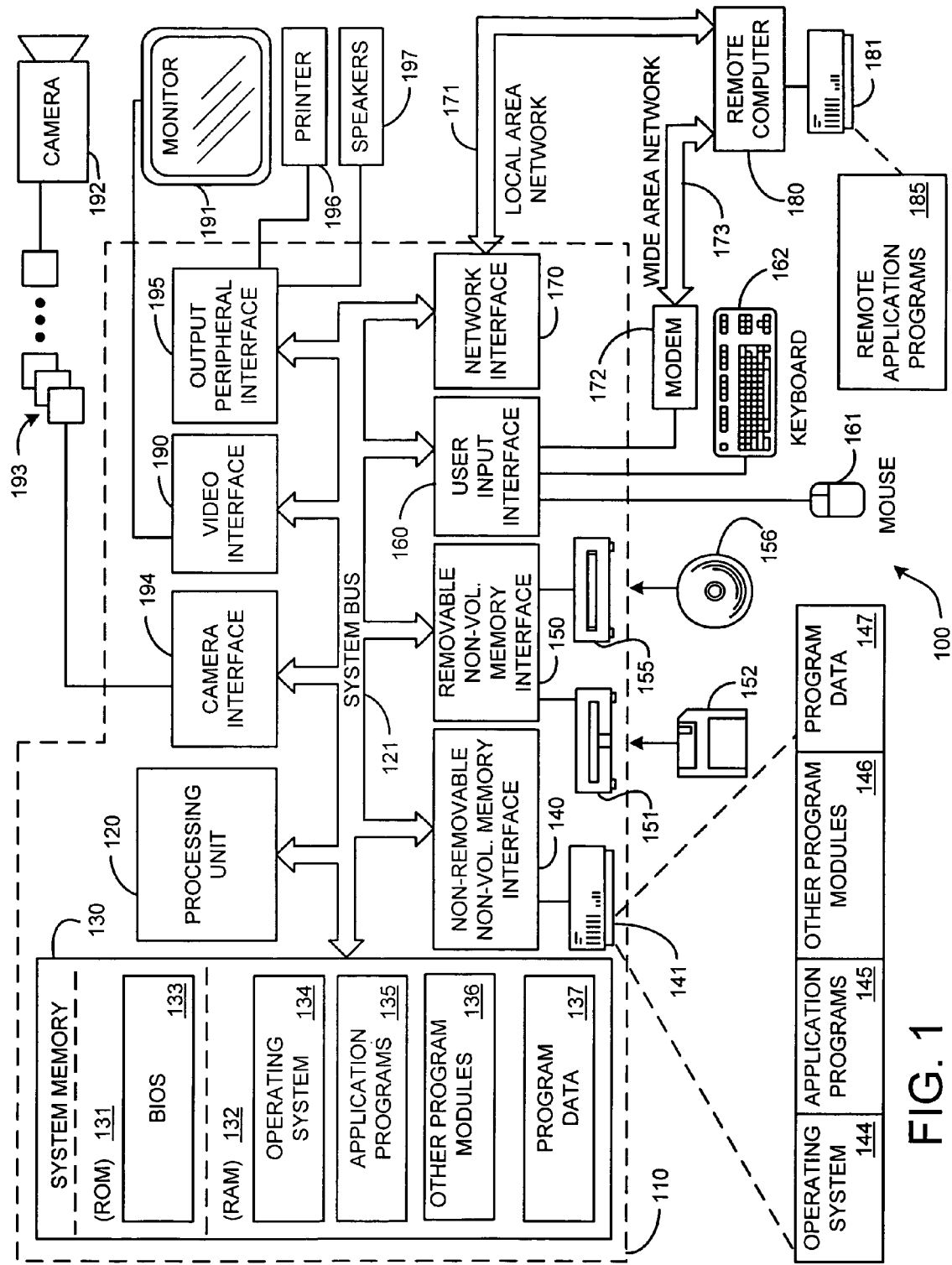
FIG. 1 is a diagram depicting a general purpose computing device constituting an exemplary system for implementing the present invention.

Before providing a more complete description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

Creating an Apparently Higher Resolution Image on a Lower Resolution Display

The human visual system is capable of amazing things. One such phenomenon is our ability to take different regions of detail and integrate them in our mind. For instance, if we are looking at a dog through a picket fence, we can't get a very good picture of it if we stand still, but if we move along the fence so we can see different bits of the dog, we are able to easily assemble these in our minds to see a complete, unobstructed dog. We do not even think of ourselves as doing such an assembly process: it just happens naturally in our minds.

The present system and process leverages this natural human ability to achieve a higher effective resolution from a fixed-resolution screen. The basic idea is to take a high resolution image I, say 400×400, that it is desired to display on a smaller screen, say 100×100, and sub-sample it N times with a 100×100 grid using kernel K to produce N low resolution images L1 ... LN, where the N images are in a continuous, closed path C. These N images are then "played back" to the user in a loop. The perception of the user is that he or she is seeing the image moving in path C' (the reflection of C) with a resolution somewhere between the original 400×400 and the smaller 100×100. This is analogous to the user moving to see through the different holes of the picket fence.

Figure 2A:
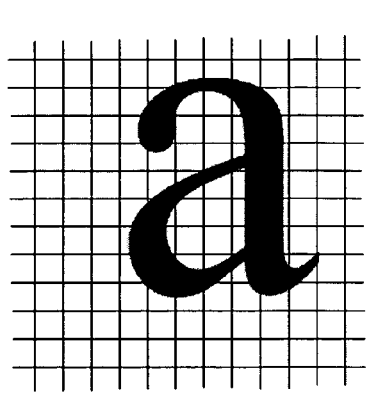
FIGS. 2(a)-(c) show a higher resolution image that has a large letter "a", with a sub-sampling grid being placed at three different positions in the successive figures.
Figure 2B:
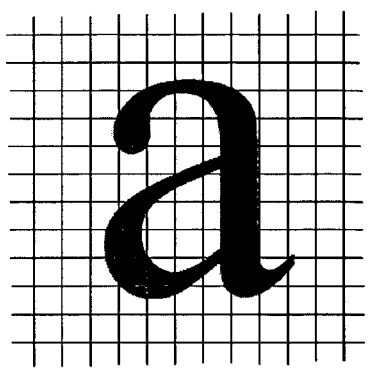
Figure 2C:
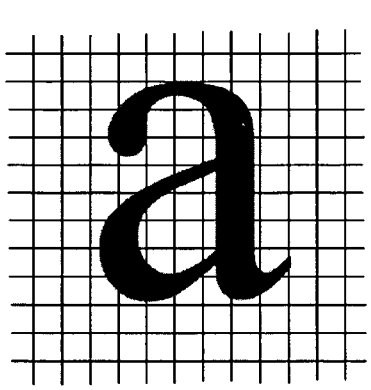
Figure 3A:
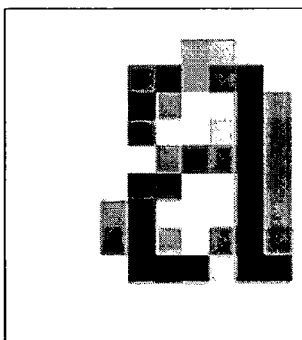
FIGS. 3(a)-(c) show what the resulting decimated images from each of the grid positions of FIGS. 2(a)-(c), respectively, might look like. Note that the images are for illustrative purposes only, and the images in FIGS. 3(a)-(c) do not correspond exactly to the grids in FIGS. 2(a)-(c).
Figure 3B:
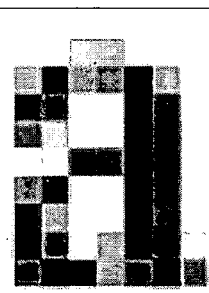
Figure 3C:
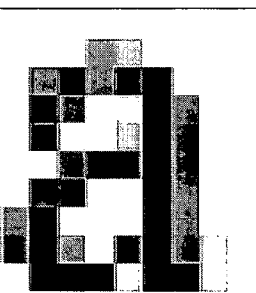

The foregoing procedure is shown schematically in FIGS. 2(a)-(c) and 3(a)-(c). In FIGS. 2(a)-(c), a high resolution image/is shown that has a large letter "a", with the sub-sampling grid being placed at three different offset positions in the successive figures. FIGS. 3(a)-(c) show what the resulting images from each of these grid positions, respectively, might look like (note that the images are for illustrative purposes only, and the images in FIGS. 3(a)-(c) do not correspond exactly to the grids in FIGS. 2(a)-(c)). The images from FIGS. 3(a)-(c) would be played to the viewer in a loop, creating the perception of a higher resolution "a."

To understand how this works in more detail, consider the kernel K(x,y) and the sub-sampling factor. The kernel K defines how the value in each pixel $L_i(x,y)$ of the low resolution image $L_i$ will be generated. K will be centered on the grid position $mx+o_x$, $my+o_y$, where m is the sub-sampling factor and o is the offset of the Nth sample. $L_i(x,y)$ will then be the following inner product integral:

$$L_i(x, y) = \int_i \int_j K(i, j) I(mx + i, my + j) \, di \, dj \quad (1)$$

In general, K(i,j) is of compact support, so the integral is efficient to compute. In addition, if I is a high resolution image instead of continuous image, this integral becomes a summation:

$$L_i(x, y) = \sum_i \sum_j K(i, j) I(mx + i, my + j) \quad (2)$$

Also note that it is mathematically equivalent to convolve the kernel K with the original image and then sub-sample. While any kernel can be employed in the above calculations, in tested embodiments it was found that a simple box function achieved the best results, i.e., $$K(x, y) = \begin{cases} 1, & -c < x < c; -c < y < c \\ 0, & \text{otherwise} \end{cases} \quad (3)$$

From a signal processing perspective, this is somewhat counterintuitive. But notice that if K corresponded to the optimal lowpass filter in the Nyquist sense (i.e., upper bounding frequency content such that there would be no aliasing in the lower resolution image), all offsets $(o_x, o_y)$ would result in precisely the same information content in the decimated image $L_i$. In other words, on reconstructing the continuous signal from the optimally decimated images, the same continuous image would be returned, albeit shifted, from each $L_i$.

The key to the present invention is that K does not remove all the upper frequencies, and in fact does cause aliasing, though in a controlled way. To see why this can work, consider where $K(x,y)=1$. In other words, just take the value of the pixel at the point that the grid falls on. If the sub-sampling factor is 4, and all 16 possible positions of the grid are iterated through, the resulting set of 16 images will contain all of the information from the original high resolution image. Of course, it would probably be difficult for a human to absorb the information if presented in such a strange way, but this shows how more information is being obtained by presenting multiple aliased images. However, by showing multiple images that each contains slightly different information that the human eye can put together, the effect of a single, moving, higher resolution image is produced. In essence, time is being traded off (by playing the loop) for space (resolution).

Figure 4:
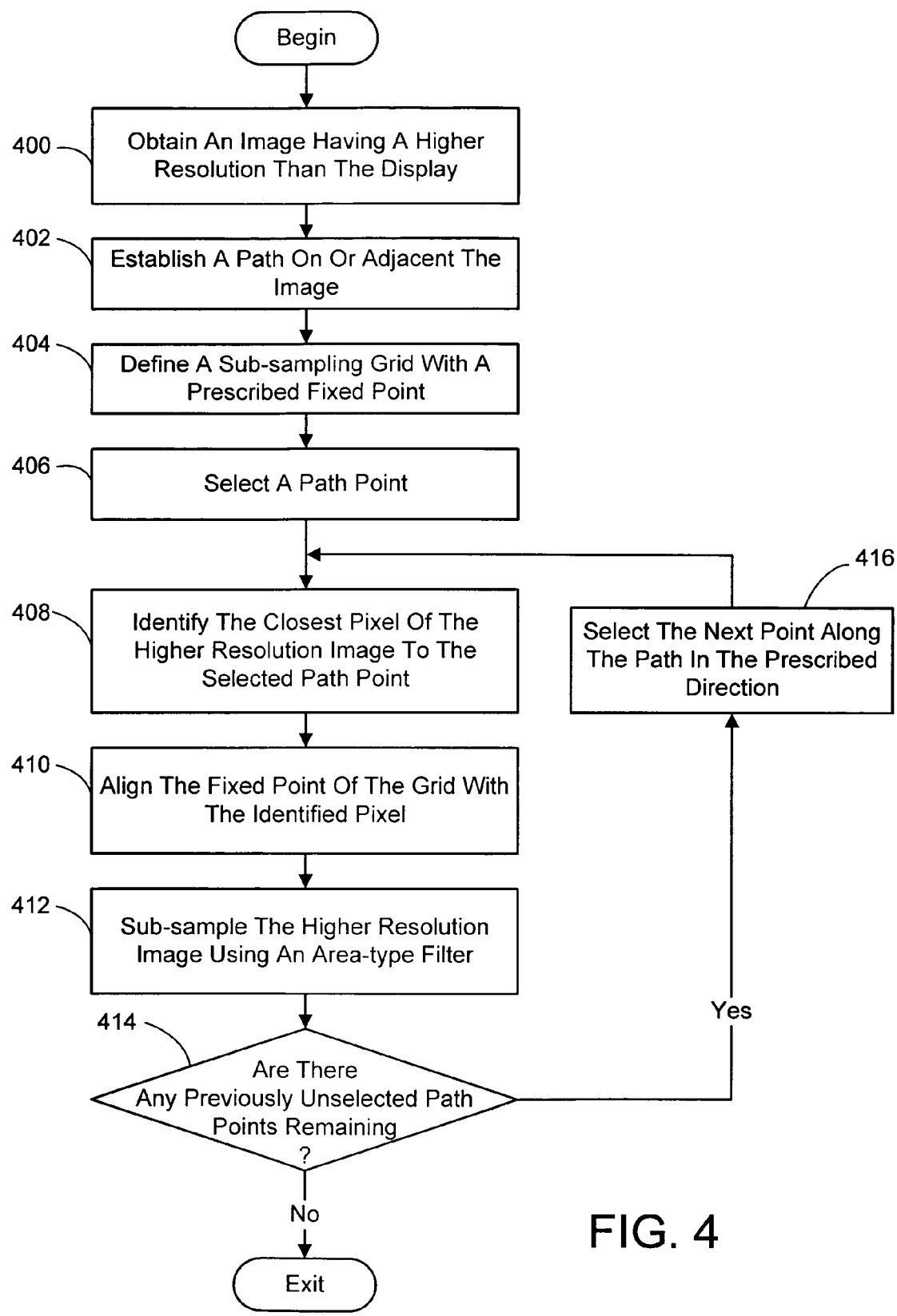
FIG. 4 shows a flow chart diagramming one embodiment of a process according to the present invention for generating decimated images that when displayed in the order they were generated and at a prescribed rate, create the appearance of an image having a higher resolution.

Referring to FIG. 4, in one implementation of the present system and process, generating the aforementioned decimated images involves first obtaining an image that has a higher resolution than the display (process action 400). For example, an image having a resolution of at least three times the target size (i.e., three times the height, and three times the width, or nine times the number of pixels) would be appropriate. If only a relatively lower resolution version (i.e., between one and three times the target size) of the image under consideration is available, it can be up-sampled to the desired resolution prior to processing. Note that if the original image is the same size as the target size or smaller, this technique will obviously provide no benefit, since there would be no information at a higher resolution to show. Once the higher resolution image is obtained, the next action 402 is to establish a path on or adjacent the image. As described previously, this path has a plurality of predefined points on it. A sub-sampling grid with a prescribed fixed point thereon is also defined in process action 404. The fixed point can be, for example, the intersection point at the upper left hand corner of the grid. The grid has intersection points spaced apart so as to correspond to a prescribed sampling frequency, and such that the number of points on the grid corresponds to the size of the target image. Next, one of the points on the path is selected (process action 406), and the closest pixel of the higher resolution image to the selected point is identified (process action 408). The fixed point of the grid is aligned with the identified pixel (process action 410) and the image is decimated using an area-type filter (as defined in Eqs. (1) and (2)) (process action 412). This establishes a pixel value for each intersection point of the grid, thereby defining a decimated image. It is then determined if there are any previously unselected path points remaining (process action 414). If not, the process ends. However, if there are points remaining, then the next point along the path in a prescribed direction is selected (process action 416) and process actions 408 through 416 are repeated, as appropriate.

The result of the foregoing procedure is to generate the aforementioned sequence of decimated images. As described earlier, this image sequence creates the appearance of an image having a higher resolution than that of the individual decimated images and which moves in a course corresponding to the path, when displayed in the order they were generated (and/or in the order of the aforementioned path) and at a prescribed rate. The prescribed rate is ideally chosen so as to be fast enough to make the movement of the image appear substantially continuous to a viewer. However, in tested embodiments it was found that a rate of about 15 images per second or more produce satisfactory results.

It is noted that a computing device associated with a display on which the present system and process is implemented can be tasked with generating and displaying the sequence of decimated images to produce the apparently higher resolution image on the display. However, in an alternate scenario, a separate computing device can be used to generate the decimated images and then they are transmitted to another computing device for display in manner described above.

The overall size of the grid is made such that it at least covers each object of interest in the image regardless of which image pixel the fixed point of the grid is aligned with. In addition, the size of the aforementioned closed path and the separation of the predefined points thereon can be selected such that the overall excursion of the viewed movement is made as small as possible to minimize any distracting effect on a viewer, while still being large enough to ensure each decimated image exhibits substantially different bits of detail of the higher resolution image. In one embodiment of the invention, the predefined points of the closed path are equally spaced apart on the path, and exceed in number the size factor between the source image and the destination display, where the size factor is defined as the number of pixels in the source image divided by the number of pixels in the display. Note that this size factor represents the loss in information between the source and destination image sizes. For instance, if the source image were 300×300 pixels, and the target display were 100×100 pixels, the size factor would be 9, so there would be 9 times less information (pixels) in the destination display for a given static image. If we were then to use more than 9 decimated images to compensate for the loss of information, we would be exceeding the size factor. In tested embodiments, the closed path was substantially circular and 30 path points were employed to produce 30 decimated images. While any path can be used, it is believed that a circular path produces the least objectionable motion when the decimated images are played back.

In regard to the decimating process, a sub-Nyquist filter is applied to establish each pixel value of a decimated image. In tested embodiments, an area-type filter was used for this purpose to establish, for each grid intersection point, a single pixel value from all the values associated with pixels found within an area defined by the filter about the intersection point. The particular area-type filter used was a box function filter, although other types could be used as well. In another embodiment of the present invention, the higher resolution image is first convolved with the particular filter employed, and then the convolved image is decimated using the grid. The alternate procedure is mathematically equivalent to the former method and produces the same results.

It is further noted that generating the sequence of images can alternately involve making the active area of each pixel in the display device smaller than the pixel size. For instance, imagine a 100×100 pixel display where each pixel was 1 mm×1 mm. Instead of the entire 1 mm×1 mm pixel being active, consider if only a 0.33 mm×0.33 mm square in the center of the pixel were active. Thus the active pixels would have the same size (pitch) as pixels in a 300×300 grid, though only one out of every nine pixels would be active. If we were now to show an image of size 300×300 in this grid but only show every third pixel, it would be like looking at the full image on a 300×300 grid with 0.33 mm×0.33 mm pixels with eight out of every nine pixels turned off—analogous to looking at the dog through the picket fence. If we now changed the offset after which we chose every third pixel, we would see different bits of detail appear with each offset. However, this has the advantage of explicitly modeling a physical phenomena, i.e., the high resolution image being covered by a grating, and thus may be more pleasing/intuitive to the user.

In FIG. 5, the optimal version of a test image decimated by a factor of three is shown. The image was filtering with the appropriate Nyquist kernel to remove all aliasing and then sub-sampled. This image represents the best resolution possible using existing methods. In FIG. 6, a "freeze frame" of the animation of the $L_i$ images produced in accordance with the present invention is shown. While the static image is naturally of lower quality than the optimal image in FIG. 5, the animation through the set of $L_i$'s produces a more legible version of the text than FIG. 5.

Wherefore, what is claimed is:

1. A computer-implemented process for creating an apparently higher resolution image of a scene on a display exhibiting a resolution that is lower than said apparently higher resolution, comprising using a computer to perform the following process actions:
    generating a sequence of images which exhibit said lower resolution, wherein each of the images is generated by moving a sub-sampling grid comprising intersection points spaced apart so as to correspond to a prescribed sub-sampling frequency to a different offset in relation to an image of said scene having a higher resolution than the display and decimating the higher resolution image at each offset to generate a lower-resolution image, said moving and decimation comprising,
        assigning a fixed point on the grid,
        establishing a path on or adjacent the higher resolution image, said path having a plurality of predefined points thereon,
        for each point in turn on the path,
            finding the closest pixel of the image,
            aligning the fixed point of the grid with said closest pixel, and
            decimating the image to establish for each grid intersection point a single pixel value, thereby generating a decimated image; and
    displaying the sequence of images on the display in an order in which they were generated and at a prescribed rate, so as to create the appearance of an image of the scene having a higher resolution than that of the individual decimated images.

2. The process of claim 1, wherein the process action of decimating the higher resolution image at each offset, comprises an action of using a sub-Nyquist filter.

3. The process of claim 1, wherein the process action of decimating the higher resolution image at each offset comprises an action of employing an area-type filter to establish for each grid intersection point a single pixel value from all the values associated with pixels found within an area defined by the filter about the intersection point.

4. The process of claim 1, wherein the process action of decimating the higher resolution image at each offset comprises an action of employing a box function filter to establish for each grid intersection point a single pixel value with equal contributions from all the values associated with pixels within the area defined by the box function about the intersection point.

5. The process of claim 1, further comprises an action of convolving the higher resolution image with a sub-Nyquist filter prior to generating the sequence of images.

6. A computer-readable storage medium having computer-executable instructions stored thereon for performing the process actions recited in claim 1.

7. A system for creating an apparently higher resolution image on a display exhibiting a resolution that is lower than said apparently higher resolution, comprising:
    a general purpose computing device;
    a computer program comprising program modules loaded on a memory in communication with the general purpose computing device, wherein the computing device is directed by the program modules of the computer program to,
        input an image having a higher resolution than the display;
        establish a path on or adjacent the image which has a plurality of predefined points thereon;
        define a sub-sampling grid with a prescribed fixed point thereon, said grid having intersection points spaced apart so as to correspond to a prescribed sampling frequency; and
        for each point in turn on the path,
            find the closest pixel of the image,
            align the fixed point of the grid with said closest pixel,
            decimate the image using an area-type filter which establishes a pixel value for each grid intersection point, to generate a decimated image having a lower resolution than the input image; and wherein
        the resulting sequence of decimated images when displayed on the display in an order in which fall on the path and at a prescribed rate, creates the appearance of an image having a higher resolution than that of the individual decimated images which moves in a course corresponding to said path.

8. The system of claim 7, wherein the input image is a high resolution image which is at least twice the resolution in width and height than the generated sequence of lower resolution images.

9. The system of claim 7, wherein the input image exhibits a lower resolution than desired, and wherein the computer program further comprises a program module for up-sampling the input image to the desired resolution prior to further processing.

10. The system of claim 7, wherein the overall size of the grid is such that it at least covers each of one or more objects of interest in the image regardless of which image pixel the fixed point of the grid is aligned with.

11. The system of claim 7, wherein the path is a closed path.

12. The system of claim 11, wherein the program module for establishing a path comprises a sub-module for selecting the size of the closed path and the separation of the predefined points thereon such that an excursion of said movement of the image is made as small as possible to minimize any distracting effect on a viewer while still being large enough to ensure each decimated image exhibits different pixel value information derived from the input image.

13. The system of claim 12, wherein the predefined points of the closed path are equally spaced apart on the path.

14. The system of claim 13, wherein the number of predefined points of the closed path exceeds a size ratio, where the size ratio is defined as the number of pixels in the source image to the number of pixels in each of the sequence of generated lower resolution images.

15. The system of claim 7, wherein the prescribed rate at which the decimated images are displayed is fast enough to make said movement of the image appear substantially continuous to a viewer.

16. The system of claim 7, further comprising a display associated with the computing device, and wherein said resulting sequence of decimated images is displayed on the display associated with the computing device.

17. The system of claim 7, wherein a display is associated with a remote computing device that is in communication with the computing device that is executing the computer program modules, and wherein said resulting sequence of decimated images is provided by the computing device to the remote computing device for display.

18. A process for creating an apparently higher resolution image on a display exhibiting a resolution that is lower than said apparently higher resolution, comprising:

an inputting step for inputting an image having a higher resolution than the display;

an establishing step for establishing a path on or adjacent the image which has a plurality of predefined points thereon, wherein the number of predefined points of the path exceeds a size ratio;

a defining step for defining a sub-sampling grid with a prescribed fixed point thereon, said grid having intersection points spaced apart so as to correspond to a prescribed sampling frequency; and for each point in turn on the path performing,
    a finding step for finding the closest pixel of the image,
    an aligning step for aligning the fixed point of the grid with said closest pixel,
    a decimating step for decimating the image using an area-type filter which establishes for each grid intersection point a single pixel value, to generate a decimated image having a lower resolution than the input image; and wherein said size ratio is defined as the number of pixels in the input image to the number of pixies in each of the resulting sequence of decimated images, and the resulting sequence of decimated images when displayed on the display in an order in which fall on the path and at a prescribed rate, creates the appearance of an image having a higher resolution than that of the individual decimated images which moves in a course corresponding to said path.

* * * * *